(12) United States Patent
Murata et al.

(10) Patent No.: US 6,998,175 B2
(45) Date of Patent: *Feb. 14, 2006

(54) HEAT-PEELABLE PRESSURE-SENSITIVE ADHESIVE SHEET

(75) Inventors: Akihisa Murata, Osaka (JP);
Toshiyuki Oshima, Osaka (JP); Yukio Arimitsu, Osaka (JP); Kazuyuki Kiuchi, Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 36 days.

(21) Appl. No.: 09/853,787

(22) Filed: May 14, 2001

(65) Prior Publication Data
US 2001/0055678 A1     Dec. 27, 2001

(30) Foreign Application Priority Data
May 15, 2000 (JP) ......................... P.2000-142513

(51) Int. Cl.
*C09J 7/02*     (2006.01)
*B32B 27/00*     (2006.01)

(52) U.S. Cl. ..................... 428/354; 428/40.1; 428/343; 428/346; 428/355 R; 428/355 AC; 428/355 EN; 428/356; 428/922

(58) Field of Classification Search ............... 428/40.1, 428/343, 346, 354, 355 R, 355 AC, 355 EN, 428/356, 922
See application file for complete search history.

(56) References Cited

U.S. PATENT DOCUMENTS 4,223,067 A    *    9/1980    Levens ....................... 428/308

(Continued)

FOREIGN PATENT DOCUMENTS

JP        B-50-13878       5/1975

(Continued)

OTHER PUBLICATIONS

English Translation of JP 11-166164, entire document, Jun. 22, 1999.*

(Continued)

*Primary Examiner*—Daniel Zirker
(74) *Attorney, Agent, or Firm*—Sughrue Mion, PLLC

(57) ABSTRACT

A heat-peelable pressure-sensitive adhesive sheet which, even when used for temporarily fixing electronic parts having poor resistance to static electricity, such as magnetic heads, is effective in preventing the yield of such electronic parts from being reduced by electrostatic breakage, while ensuring its functions of adhesiveness before heating and peelability after heating. The heat-peelable pressure-sensitive adhesive sheet comprises a substrate and formed on at least one side thereof a heat-expandable pressure-sensitive adhesive layer containing heat-expandable microspheres, wherein the heat-expandable pressure-sensitive adhesive layer has a surface resistivity of $10^{12}$ $\Omega/\square$ or lower. In this heat-peelable pressure-sensitive adhesive sheet, the heat-expandable pressure-sensitive adhesive layer before heating may have a center line average surface roughness of 2 $\mu$m or less and a maximum surface roughness of 5 $\mu$m or less. The adhesive sheet may have a rubber-like organic elastic layer interposed between the substrate and the heat-expandable pressure-sensitive adhesive layer.

11 Claims, 1 Drawing Sheet

U.S. PATENT DOCUMENTS

| | | | |
|---|---|---|---|
| 4,855,170 A * | 8/1989 | Darvell et al. | 428/40 |
| 5,508,107 A * | 4/1996 | Gutman et al. | 428/339 |
| 5,902,678 A | 5/1999 | Konda et al. | |
| 6,224,975 B1 * | 5/2001 | Wang | 428/354 |
| 2001/0020515 A1 * | 9/2001 | Shibata et al. | 156/329 |

FOREIGN PATENT DOCUMENTS

| | | |
|---|---|---|
| JP | B-51-24534 | 7/1976 |
| JP | A-56-61468 | 5/1981 |
| JP | A-56-61469 | 5/1981 |
| JP | A-60-252681 | 12/1985 |
| JP | 04-292943 * | 10/1992 |
| JP | 07-026223 * | 1/1995 |

OTHER PUBLICATIONS

English Translation of JP 09-208910, entire document, Aug. 12, 1997.*

Patent Abstracts of Japan—JP 11 166164, vol. 1999, No. 11 (Jun. 22, 1999).

XP-002191577 (Aug. 12, 1997).

European Search Report dated Mar. 27, 2002.

* cited by examiner

HEAT-PEELABLE PRESSURE-SENSITIVE ADHESIVE SHEET

FIELD OF THE INVENTION

The present invention relates to a heat-peelable pressure-sensitive adhesive sheet which can be efficiently made easily peelable from an adherend by short-term heating at any time when required.

BACKGROUND OF THE INVENTION

Heat-peelable pressure-sensitive adhesive sheets comprising a substrate and formed thereon a pressure-sensitive adhesive layer containing a foaming agent or expanding agent, e.g., heat-expandable microspheres, have conventionally been known (see, for example, JP-B-50-13878, JP-B-51-24534, JP-A-56-61468, JP-A-56-61469, and JP-A-60-252681; the terms "JP-B" and "JP-A" as used herein mean an "examined Japanese patent publication" and an "unexamined published Japanese patent application", respectively). These heat-peelable pressure-sensitive adhesive sheets combine adhesiveness and peelability after use. This kind of pressure-sensitive adhesive sheet is characterized in that the adhesive force thereof is lowered by thermally foaming or expanding the foaming agent or expanding agent and, as a result, the adhesive sheet can be easily peeled from the adherend. Due to this characteristic, these pressure-sensitive adhesive sheets are used as a means for temporary fixation in the production of electronic parts and as labels to be recycled, etc.

With the recent trend toward capacity increase and size reduction in hard disks for use as a storage device in personal computers and the like, recording/reproducing magnetic heads of the type having a high areal recording density have come to be employed. At present, GMR (giant magnetoresistive) heads are coming to be mainly used. Although heat-peelable pressure-sensitive adhesive sheets are used for temporary fixation also in the production of such GMR heads, there has been the following problem. Since the GMR heads have poor resistance to static electricity, electrostatic breakage occurs due to static electricity generated in the head production process, resulting in an impaired yield of products.

SUMMARY OF THE INVENTION

Accordingly, an object of the invention is to provide a heat-peelable pressure-sensitive adhesive sheet which, even when used for temporarily fixing electronic parts having poor resistance to static electricity, such as magnetic heads, is effective in preventing the yield of such electronic parts from being reduced by electrostatic breakage, while ensuring its functions of adhesiveness before heating and peelability after heating.

The present inventors made intensive investigations in order to accomplish the object described above. As a result, they have found that the electrostatic breakage of electronic parts can be prevented when a heat-expandable pressure-sensitive adhesive layer is regulated so as to have a surface resistivity not higher than a specific value. The invention has been completed based on this finding.

The invention provides a heat-peelable pressure-sensitive adhesive sheet comprising a substrate and formed on at least one side thereof a heat-expandable pressure-sensitive adhesive layer containing heat-expandable microspheres, wherein the heat-expandable pressure-sensitive adhesive layer has a surface resistivity of $10^{12}$ $\Omega/\square$ or lower.

Figure 1:
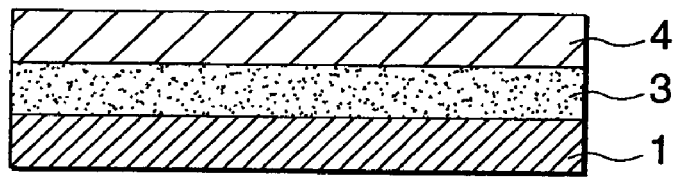
FIG. 1 is a schematic sectional view showing one embodiment of the heat-peelable pressure-sensitive adhesive sheet according to the invention.

[Description of the Reference Numerals]
1 Substrate
2 Rubber-like organic elastic layer
3 Heat-expandable pressure-sensitive adhesive layer conductive material)
4 Separator
5 Conductive layer
13 Heat-expandable pressure-sensitive adhesive layer

DETAILED DESCRIPTION OF THE INVENTION

Figure 2:
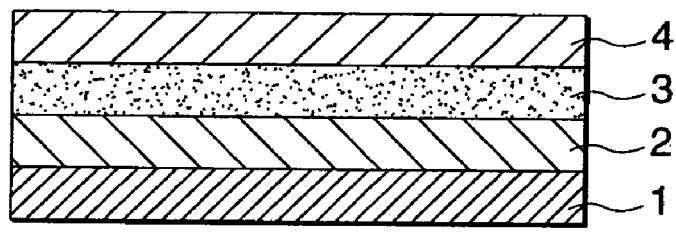
FIG. 2 is a schematic sectional view showing another embodiment of the heat-peelable pressure-sensitive adhesive sheet according to the invention.

The invention will be explained below in detail by reference to the accompanying drawings according to need. In the drawings, like members or parts are designated by like numerals. FIG. 1 is a schematic sectional view showing one embodiment of the heat-peelable pressure-sensitive adhesive sheet of the invention, and FIG. 2 is a schematic sectional view showing another embodiment of the heat-peelable pressure-sensitive adhesive sheet of the invention.

The embodiment shown in FIG. 1 comprises a substrate 1, a heat-expandable pressure-sensitive adhesive layer 3 formed on one side thereof, and a separator 4 superposed on the layer 3. The embodiment shown in FIG. 2 comprise a substrate 1, a heat-expandable pressure-sensitive adhesive layer 3 formed on one side thereof through a rubber-like organic elastic layer 2, and a separator 4 superposed on the layer 3. In each of these embodiments shown in FIGS. 1 and 2, a conductive material has been added to the heat-expandable pressure-sensitive adhesive layer 3 to regulate the surface resistivity of the heat-expandable pressure-sensitive adhesive layer 3 to $10^{12}$ $\Omega/\square$ or lower (e.g., about 0.1 to $10^{12}$ $\Omega/\square$).

The substrate 1 serves as a support for the heat-expandable pressure-sensitive adhesive layer 3 and other layers. A plastic film or sheet is generally used as the substrate 1. Other examples of usable substrates include appropriate sheets such as papers, fabrics, non-woven fabrics, metal foils, laminates of these materials with plastics, and laminates of plastic films (or sheets). The substrate 1 has a thickness of generally about 500 $\mu$m or smaller, preferably about 1 to 300 $\mu$m, more preferably about from 5 to 250 $\mu$m. However, the thickness thereof is not limited thereto. The surface of the substrate 1 may have undergone a conventional surface treatment so as to have enhanced adhesiveness to the heat-expandable pressure-sensitive adhesive layer 3 or other layers. Examples of the surface treatment include chemical or physical oxidation treatments such as chromic acid treatment, exposure to ozone, exposure to flame, exposure to high-voltage shock, and treatment with an ionizing radiation. Furthermore, the substrate 1 may have undergone coating treatment with, e.g., a release agent such as a silicone resin or fluororesin so as to have peelability from the heat-expandable pressure-sensitive adhesive layer 3 or other layers.

The substrate 1 can be a poorly bondable substrate or a strongly bondable substrate. Examples of the poorly bondable substrate include substrates made of non-polar polymers such as olefin resins, e.g., polyethylene and polypropylene, and substrates coated with the release agent. Examples of the strongly bondable substrate include substrates made of highly polar polymers such as polyesters and substrates which have undergone a surface oxidation treatment by any of the chemical and physical methods.

The poorly bondable substrate is used as the substrate for a substrate-peelable pressure-sensitive adhesive sheet, in which the substrate and the layer overlying the same can be easily peeled from each other. This substrate-peelable pressure-sensitive adhesive sheet can, for example, be used in the following manner. The pressure-sensitive adhesive sheet is applied to an adherend a, and the substrate is then peeled off to leave the heat-expandable pressure-sensitive adhesive layer on the adherend a. Thereafter, another adherend b is adherend to this heat-expandable pressure-sensitive adhesive layer. Namely, the substrate-peelable pressure-sensitive adhesive sheet can be used as an adhesive for temporary fixation. In this case, when the adherend state is desired to be ended, the adhesive layer is heated, whereby the adherends a and b can be easily separated from each other. On the other hand, the strongly bondable substrate is used as the substrate for a substrate-fixed pressure-sensitive adhesive sheet, wherein the substrate is strongly bonded to the layer overlying the same. Such a substrate-fixed pressure-sensitive adhesive sheet can be adhered to an adherend at a predetermined adhesive force. When the adhered state of this adhesive sheet is desired to be ended, the adhesive sheet is heated, whereby it can be easily peeled or separated from the adherend.

The rubber-like organic elastic layer 2 has the following two functions. When the heat-peelable pressure-sensitive adhesive sheet is adhered to an adherend, the elastic layer functions to enable the surface of the pressure-sensitive adhesive sheet to satisfactorily conform to the surface shape of the adherend to thereby attain an increased adhesion area. When the pressure-sensitive adhesive sheet is heated for peeling from an adherend, the elastic layer functions to highly (accurately) control the thermal expansion of the heat-expandable layer to thereby enable the heat-expandable layer to evenly expand preferentially in the thickness direction.

From the standpoint of imparting those functions, the rubber-like organic elastic layer 2 is preferably formed from natural rubber, a synthetic rubber, or a synthetic resin having rubber elasticity which each has, for example, a D-scale Shore hardness as measured in accordance with ASTM D-2240 of 50 or lower, preferably 40 or lower.

Examples of the synthetic rubber or synthetic resin having rubber elasticity include synthetic rubbers such as nitrile, diene, and acrylic rubbers; thermoplastic elastomers such as polyolefins and polyesters; and synthetic resins having rubber elasticity, such as ethylene/vinyl acetate copolymers, polyurethanes, polybutadiene, and flexible poly(vinyl chloride). Even polymers which are intrinsically rigid, such as poly (vinyl chloride), can be made to have rubber elasticity by incorporating a plasticizer, softener, or the like thereinto. Such compositions can also be used as a material for constituting the rubber-like organic elastic layer. Furthermore, pressure-sensitive adhesive materials, such as, e.g., the pressure-sensitive adhesive constituting the heat-expandable pressure-sensitive adhesive layer 3 which will be described later, can be advantageously used as a material for constituting the rubber-like organic elastic layer 2.

The rubber-like organic elastic layer 2 has a thickness of generally about 500 $\mu$m or smaller (e.g., 1 to 500 $\mu$m), preferably about 3 to 300 $\mu$m, more preferably about 5 to 150 $\mu$m.

An appropriate method can be used for forming the rubber-like organic elastic layer 2. Examples thereof include a method in which a coating fluid containing an elastic layer-forming material such as natural rubber or any of the aforementioned synthetic rubbers and synthetic resins having rubber elasticity is applied to the substrate 1 (coating method); a method in which either a film comprising the elastic layer-forming material or a laminated film prepared beforehand by forming a layer of the elastic layer-forming material on one or more heat-expandable pressure-sensitive adhesive layers 3 is adhered to the substrate 1 (dry laminating method); and a method in which a resin composition comprising the material constituting the substrate 1 and a resin composition comprising the elastic-layer-forming material are coextruded (coextrusion method).

The rubber-like organic elastic layer 2 may be made of a pressure-sensitive adhesive material comprising natural rubber, a synthetic rubber, or a synthetic resin having rubber elasticity as the main component. Alternatively, it may be made of, for example, a foamed film comprising such an ingredient as the main component. Foaming can be conducted by a conventional method. Examples thereof include a method in which mechanical agitation is used; a method in which a gas formed by reaction is used; a method in which a foaming agent is used; a method in which a soluble substance is removed; a method in which spraying is used for foaming; a method in which a syntactic foam is formed; and a sintering method. The rubber-like organic elastic layer 2 may have a single-layer structure or may be composed of two or more layers.

The heat-expandable pressure-sensitive adhesive layer 3 comprises a pressure-sensitive adhesive for imparting pressure-sensitive adhesive properties, heat-expandable microspheres (microcapsules) for imparting thermal expansibility, and a conductive material for reducing the surface resistivity of the adhesive layer to $10^{12}$ $\Omega/\square$ or lower. Due to this constitution, the pressure-sensitive adhesive sheet which has been applied to an adherend can be easily peeled off at any time after the heat-expandable pressure-sensitive adhesive layer 3 is heated to foam and/or expand the heat-expandable microspheres and thereby reduce the adhesion area between the heat-expandable pressure-sensitive adhesive layer 3 and the adherend. If a foaming agent which has not been microencapsulated is used, satisfactory peelability cannot be imparted stably. In the case where this pressure-sensitive adhesive sheet is used for temporarily fixing electronic parts in the production thereof, the adhesive sheet is effective in preventing the electronic parts from suffering static breakage even when the electronic parts are ones having poor resistance to static electricity, such as magnetic heads, to thereby inhibit the yield of products from decreasing.

The pressure-sensitive adhesive is preferably one which restrains, in the lowest possible degree, the foaming and/or expansion of the heat-expandable microspheres during heating. Examples thereof include known pressure-sensitive adhesives such as rubber-based pressure-sensitive adhesives, acrylic pressure-sensitive adhesives, vinyl alkyl ether-based pressure-sensitive adhesives, silicone-based pressure-sensitive adhesives, polyester-based pressure-sensitive adhesives, polyamide-based pressure-sensitive adhesives, urethane-based pressure-sensitive adhesives, styrene/diene block copolymer-based pressure-sensitive adhesives, and pressure-sensitive adhesives having improved creep characteristics obtained by incorporating a hot melt resin having a melting point of about 200° C. or lower into these pressure-sensitive adhesives. Such pressure-sensitive adhesives can be used alone or in combination of two or more thereof (see, for example, JP-A-56-61468, JP-A-61-174857, JP-A-63-17981, and JP-A-56-13040). The pressure-sensitive adhesive may contain appropriate additives besides the pressure-sensitive adhesive ingredient (base polymer). Examples of the additives include crosslinking agents (e.g., polyisocyanates and melamine alkyl ethers), tackifiers (e.g., resins which are solid, semi-solid, or liquid at ordinary temperature, such as rosin derivative resins, polyterpene resins, petroleum resins, and oil-soluble phenol resins), plasticizers, fillers, and antioxidants.

Examples of pressure-sensitive adhesives generally used include rubber-based pressure-sensitive adhesives containing natural rubber or any of various synthetic rubbers as the base polymer; and acrylic pressure-sensitive adhesives containing as the base polymer an acrylic polymer (homopolymer or copolymer) formed from one or more monomers selected from alkyl (meth)acrylates (e.g., $C_{1-20}$ alkyl esters such as the methyl, ethyl, propyl, isopropyl, butyl, isobutyl, s-butyl, t-butyl, pentyl, hexyl, heptyl, octyl, 2-ethylhexyl, isooctyl, isodecyl, dodecyl, tridecyl, pentadecyl, hexadecyl, heptadecyl, octadecyl, nonadecyl, and eicosyl esters).

The acrylic polymer may contain units derived from one or more other monomers copolymerizable with the alkyl (meth)acrylates so as to be improved in cohesive force, heat resistance, crosslinkability, or other properties according to need. Examples of such monomers include carboxyl-containing monomers such as acrylic acid, methacrylic acid, carboxyethyl acrylate, carboxypentyl acrylate, itaconic acid, maleic acid, fumaric acid, and crotonic acid; acid anhydride monomers such as maleic anhydride and itaconic anhydride; hydroxyl-containing monomers such as hydroxyethyl (meth)acrylate, hydroxypropyl (meth) acrylate, hydroxybutyl (meth) acrylate, hydroxyhexyl (meth) acrylate, hydroxyoctyl (meth) acrylate, hydroxydecyl (meth)acrylate, hydroxylauryl (meth)acrylate, and (4-hydroxymethylcyclohexyl)methyl methacrylate; sulfo-containing monomers such as styrenesulfonic acid, allylsulfonic acid, 2-(meth) acrylamido-2-methylpropanesulfonic acid, (meth)acrylamidopropanesulfonic acid, sulfopropyl (meth) acrylate, and (meth)acryloyloxynaphthalenesulfonic acid; (N-substituted) amide monomers such as (meth) acrylamide, N,N-dimethyl (meth)acrylamide, N-butyl(meth)acrylamide, N-methylol (meth)acrylamide, and N-methylolpropane (meth) acrylamide; aminoalkyl (meth) acrylate monomers such as aminoethyl (meth)acrylate, N,N-dimethylaminoethyl (meth) acrylate, and t-butylaminoethyl (meth)acrylate; alkoxyalkyl (meth)acrylate monomers such as methoxyethyl (meth)acrylate and ethoxyethyl (meth)acrylate; maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth) acryloyloxymethylenesuccinimide, N-(meth)acryloyl-6-oxyhexamethylenesuccinimide, and N-(meth)acryloyl-8-oxyoctamethylenesuccinimide; vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxamides, styrene, α-methylstyrene, and N-vinylcaprolactam; cyanoacrylate monomers such as acrylonitrile and methacrylonitrile; epoxy-containing acrylic monomers such as glycidyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth) acrylate; acrylate monomers having a heterocycle, one or more halogen or silicon atoms, or the like, such as tetrahydrofurfuryl (meth) acrylate, fluorinated (meth)acrylates, and silicone (meth) acrylates; polyfunctional monomers such as hexanediol (meth)acrylate, (poly) ethylene glycol di(meth) acrylate, (poly) propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, epoxy acrylates, polyester acrylates, and urethane acrylates; olefin monomers such as isoprene, butadiene, and isobutylene; and vinyl ether monomers such as vinyl ether. These monomers can be used alone or in combination of two or more thereof.

From the standpoint of a balance between moderate adhesive force before heat treatment and a decrease in adhesive force through heat treatment, a preferred pressure-sensitive adhesive is one which comprises as the base polymer a polymer having a dynamic modulus of elasticity of 50,000 to 10,000,000 dyn/cm$^2$ in the temperature range of from room temperature to 150° C.

The heat-expandable microspheres are not particularly limited as long as they are microcapsules obtained by encapsulating a substance which readily gasifies and expands upon heating, such as isobutane, propane, or pentane, in elastic shells. In many cases, the shells are made of a hot-melt material or a material which is broken by thermal expansion. Examples of the shell-forming material include vinylidene chloride/acrylonitrile copolymers, poly(vinyl alcohol), poly(vinyl butyral), poly(methyl methacrylate), polyacrylonitrile, poly (vinylidene chloride),and polysulfones. The heat-expandable microspheres can be produced by a conventional method such as coacervation or interfacial polymerization. A commercial product of heat-expandable microspheres, e.g., MICROSPHERE (trade name; manufactured by Matsumoto Yushi Seiyaku K. K.), is also usable.

From the standpoint of efficiently lowering the adhesive force of the pressure-sensitive adhesive layer by heat treatment, it is preferred to use heat-expandable microspheres having such a moderate strength that they do not break until the volume expansion ratio thereof reaches at least 5 times, preferably at least 7 times, more preferably at least 10 times.

The amount of the heat-expandable microspheres to be incorporated can be suitably determined according to the desired expansion ratio of the pressure-sensitive adhesive layer, the desired degree of decrease of the adhesive force thereof, etc. However, the heat-expandable microspheres are incorporated, for example, in an amount of generally 1 to 150 parts by weight, preferably 10 to 130 parts by weight, more preferably 25 to 100 parts by weight, per 100 parts by weight of the base polymer constituting the heat-expandable pressure-sensitive adhesive layer 3.

In order for the heat-expandable pressure-sensitive adhesive layer in the invention to exhibit satisfactory adhesiveness, the adhesive layer before heating has a center line average surface roughness of preferably 2 μm or less (e.g., about 0.02 to 2 μm), more preferably 0.4 μm or less (e.g., about 0.02 to 0.4 μm), and a maximum surface roughness of preferably 5 μm or less (e.g., about 0.1 to 5 μm), more preferably 4 μm or less (e.g., about 0.5 to 4 μm). The center line average surface roughness and maximum surface roughness of the heat-expandable pressure-sensitive adhesive layer before heating can be regulated by suitably selecting the thickness of the heat-expandable pressure-sensitive adhesive layer 3, the particle diameter of the heat-expandable microspheres to be added to the pressure-sensitive adhesive layer, and the particle diameter of the conductive material which will be described later.

The particle diameter of the heat-expandable microspheres preferably satisfies the relationship (thickness of the heat-expandable pressure-sensitive adhesive layer 3)≧(particle diameter of the heat-expandable microspheres) so as to ensure that the heat-expandable pressure-sensitive adhesive layer before heating has a center line average surface roughness of 2 μm or less and/or a maximum surface roughness of 5 μm or less as stated above. If the particle diameter of the heat-expandable microspheres is greater than the thickness of the heat-expandable pressure-sensitive adhesive layer 3, the surface of this heat-expandable pressure-sensitive adhesive layer 3 has too high roughness, resulting in a decrease in the effective adhesion area between the pressure-sensitive adhesive layer and an adherend. In the case where the rubber-like organic elastic layer 2 is interposed between the substrate 1 and the heat-expandable pressure-sensitive adhesive layer 3, heat-expandable microspheres having a particle diameter slightly greater than the thickness of the heat-expandable pressure-sensitive adhesive layer 3 may be used because the rubber-like organic elastic layer 2 is expected to have the effect of buffering such large microspheres. Consequently, the relationship given above does not apply in this case. The particle diameter of heat-expendable microspheres may be regulated during the formation thereof. Alternatively, it may be regulated after microsphere formation by, e.g., classification.

The conductive material to be added to the heat-expandable pressure-sensitive adhesive layer 3 is not particularly limited as long as it has excellent electrical conductivity. Examples thereof include inorganic conductive materials such as metals (e.g., copper, nickel, silver, aluminum, and iron), metal-plated substances, metal oxides (e.g., tin oxide, zinc oxide, and silica), aluminosilicates (e.g., mica), and carbonaceous materials (e.g., carbon black and carbon fibers); and organic conductive materials such as generally used various organic antistatic agents including surfactants (e.g., nonionic antistatic agents such as polyether compounds, anionic antistatic agents such as poly(styrenesulfonic acid) compounds, cationic antistatic agents such as quaternary ammonium salts and polystyrene having cationic groups, and amphoteric antistatic agents) and conductive polymers (organic semiconducting polymers), e.g., polyene polymers, aromatic polymers, heterocyclic polymers, copolymers, and ladder polymers. These conductive materials may be suitably used alone or in combination of two or more thereof.

In the case where a particulate conductive material, e.g., an inorganic conductive material such as a metal or metal oxide, is added, this conductive material preferably satisfies the relationship (thickness of the heat-expandable pressure-sensitive adhesive layer 3)≧(particle diameter of the conductive material) so as to ensure that the heat-expandable pressure-sensitive adhesive layer before heating has a center line average surface roughness of 2 μm or less and/or a maximum surface roughness of 5 μm or less as stated above. If the particle diameter of the conductive material is greater than the thickness of the heat-expandable pressure-sensitive adhesive layer 3, the surface of this heat-expandable pressure-sensitive adhesive layer 3 has too high roughness, resulting in a decrease in the effective adhesion area between the pressure-sensitive adhesive layer and an adherend. In the case where the rubber-like organic elastic layer 2 is interposed between the substrate 1 and the heat-expandable pressure-sensitive adhesive layer 3, a conductive material having a particle diameter slightly greater than the thickness of the heat-expandable pressure-sensitive adhesive layer 3 may be used because the rubber-like organic elastic layer 2 is expected to have the effect of buffering such large particles of the conductive material. Consequently, the relationship given above does not apply in this case.

Although the amount of a particulate conductive material to be added is preferably larger from the standpoint of lowering the surface resistivity of the pressure-sensitive adhesive layer, too large amounts thereof result in reduced adhesiveness. Because of this, the particulate conductive material is added, for example, in an amount of preferably 50 to 200 parts by weight, more preferably 70 to 150 parts by weight, per 100 parts by weight of the base polymer constituting the heat-expandable pressure-sensitive adhesive layer 3. With respect to the particle shape of the particulate conductive material, acicular shape is preferred to platy shape, which in turn is preferred to spherical shape. This is because the amount of acicular conductive particles necessary for establishing a conductive network is smaller than that of platy ones, which in turn is smaller than that of spherical ones.

In the case of using an organic antistatic agent or the like as the conductive material, it is added in an amount of preferably 0.5 to 30 parts by weight, more preferably 1 to 5 parts by weight, per 100 parts by weight of the base polymer constituting the heat-expandable pressure-sensitive adhesive layer 3. However, the amount thereof should not be construed as being limited thereto. Too large amounts of the organic conductive material tend to result in reduced adhesiveness, while too small amounts thereof tend to result in difficulties in obtaining an antistatic effect. In the case where a conductive material capable of being dissolved or dispersed in solvents, such as an organic antistatic agent or the like, is used, it may be applied to the surface of the heat-expandable pressure-sensitive adhesive layer 3 by spraying, besides being incorporated into the heat-expandable pressure-sensitive adhesive layer 3.

The heat-expandable pressure-sensitive adhesive layer 3 can be formed by a conventional method. For example, it can be formed by a method in which a coating fluid comprising a pressure-sensitive adhesive, heat-expandable microspheres, and a conductive material and optionally containing a solvent is prepared and applied to the substrate 1 or the rubber-like organic elastic layer 2, or by a method in which the coating fluid is applied to an appropriate separator (e.g., release paper) to form a heat-expandable pressure-sensitive adhesive layer and this layer is transferred (shifted) to the substrate 1 or the rubber-like organic elastic layer 2. The heat-expandable pressure-sensitive adhesive layer 3 may have a single-layer structure or may be composed of two or more layers. In the case of using an insoluble conductive material such as, e.g., an inorganic particulate conductive material, a preferred method for forming the heat-expandable pressure-sensitive adhesive layer 3 having reduced surface roughness and satisfactory adhesiveness is not the method comprising directly forming the adhesive layer on the substrate 1 or rubber-like organic elastic layer 2 but the method comprising firstly forming the adhesive layer on a separator and then transferring it to the substrate 1 or rubber-like organic elastic layer 2.

The thickness of the heat-expandable pressure-sensitive adhesive layer 3 is preferably 300 μm or smaller, more preferably 100 μm or smaller. If the thickness thereof is too large, cohesive failure is apt to occur when the pressure-sensitive adhesive sheet is peeled off after heating. As a result, the pressure-sensitive adhesive partly remains on the adherend to foul it. On the other hand, if the thickness of the pressure-sensitive adhesive layer is too small, the heat-expandable pressure-sensitive adhesive layer 3 deforms insufficiently upon heating and, hence, the adhesive force cannot be smoothly lowered. In addition, such too small thicknesses thereof may necessitate use of heat-expandable microspheres having an excessively small particle diameter. From these standpoints, the thickness of the heat-expandable pressure-sensitive adhesive layer 3 is preferably 5 μm or large, more preferably 10 μm or larger, most preferably 15 μm or larger.

As the separator 4 can be used a conventional release paper or the like. The separator 4, which is used as a protector for the heat-expandable pressure-sensitive adhesive layer 3, is peeled off when the pressure-sensitive adhesive sheet is applied to an adherend. The separator 4 is not indispensable.

Figure 3:
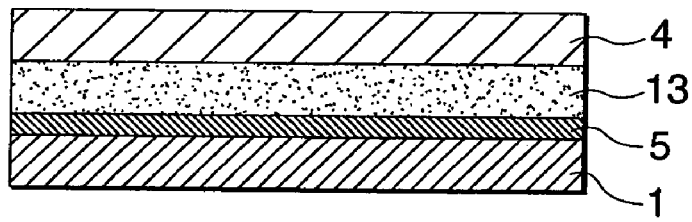
FIG. 3 is a schematic sectional view showing still another embodiment of the heat-peelable pressure-sensitive adhesive sheet according to the invention.
Figure 4:
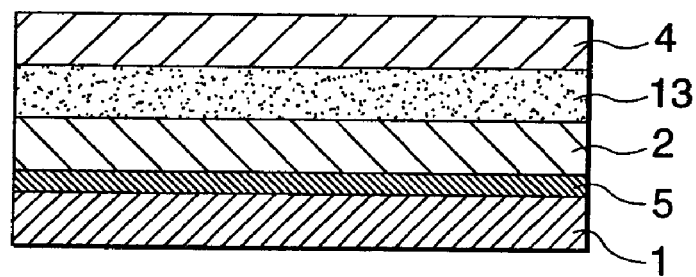
FIG. 4 is a schematic sectional view showing a further embodiment of the heat-peelable pressure-sensitive adhesive sheet according to the invention.

FIGS. 3 and 4 are schematic sectional views respectively showing still other embodiments of the heat-peelable pressure-sensitive adhesive sheet of the invention. The embodiment shown in FIG. 3 comprises a substrate 1, an electric conductive layer 5 formed on one side thereof, and superposed on the electric conductive layer 5 in this order a heat-expandable pressure-sensitive adhesive layer 13 and a separator 4. The embodiment shown in FIG. 4 comprises a substrate 1, an electric conductive layer 5 formed on one side thereof, and superposed on the electric conductive layer 5 in this order a rubber-like organic elastic layer 2, a heat-expandable pressure-sensitive adhesive layer 13, and a separator 4. In each of these embodiments shown in FIGS. 3 and 4, the surface resistivity of the heat-expandable pressure-sensitive adhesive layer 13 has been regulated to $10^{12}$ Ω/□ or lower (e.g., about 0.1 to $10^{12}$ Ω/□) by forming the electric conductive layer 5 on a surface of the substrate 1.

The heat-expandable pressure-sensitive adhesive layer 13 comprises a pressure-sensitive adhesive for imparting pressure-sensitive adhesive properties and heat-expandable microspheres (microcapsules) for imparting thermal expansibility. Due to this constitution, the pressure-sensitive adhesive sheet which has been applied to an adherend can be easily peeled off at any time after the heat-expandable pressure-sensitive adhesive layer 13 is heated to foam and/or expand the heat-expandable microspheres and thereby reduce the adhesion area between the heat-expandable pressure-sensitive adhesive layer 13 and the adherend. The pressure-sensitive adhesive and the heat-expandable microspheres are the same as the pressure-sensitive adhesive and heat-expandable microspheres in the heat-expandable pressure-sensitive adhesive layer 3 described above. In these embodiments, the heat-expandable pressure-sensitive adhesive layer 13 may contain a conductive material as in the embodiments shown in FIGS. 1 and 2. The heat-expandable pressure-sensitive adhesive layer 13 can be formed in the same manner as the heat-expandable pressure-sensitive adhesive layer 3 described above. The thickness of the heat-expandable pressure-sensitive adhesive layer 13 is the same as that of the heat-expandable pressure-sensitive adhesive layer 3.

The conductive layer 5 can be formed by, for example, vapor-depositing a metal, e.g., aluminum, or a metal oxide on the substrate 1 or by a coating treatment (thin layer formation) in which a fluid prepared by dissolving or dispersing an inorganic conductive material, e.g., conductive mica, or an organic antistatic agent, e.g., a cationic antistatic agent of the quaternary ammonium salt type, in an appropriate solvent is applied to the substrate 1.

In each of the embodiments described above, the heat-expandable pressure-sensitive adhesive layer 3 (or 13) can be formed not only on one side of the substrate 1 but also on each side thereof. The rubber-like organic elastic layer 2 also can be formed on one or each side of the substrate 1 according to need. Furthermore, an ordinary adhesive layer containing no heat-expandable microspheres may be formed on one side of the substrate 1 having the heat-expandable pressure-sensitive adhesive layer 3 (or 13) on the other side. In addition, an interlayer such as a primer layer or adhesive layer may be formed, for example, between the substrate 1 and the rubber-like organic elastic layer 2 or between the rubber-like organic elastic layer 2 and the heat-expandable pressure-sensitive adhesive layer 3 (or 13).

Techniques for regulating the surface resistivity of the heat-expandable pressure-sensitive adhesive layer to $10^{12}$ Ω/□ or lower in the invention are not limited to those described above. Other examples thereof include a technique in which the substrate 1 itself is constituted of a conductive material, e.g., a metal foil, a technique in which a conductive material is added to the substrate 1 or rubber-like organic elastic layer 2, and a technique in which a conductive layer consisting of or containing a conductive material is formed between the rubber-like organic elastic layer 2 and the heat-expandable pressure-sensitive adhesive layer 3 (or 13).

Since the heat-expandable pressure-sensitive adhesive layer 13 in the heat-peelable pressure-sensitive adhesive sheet of the invention has been regulated so as to have a surface resistivity of $10^{12}$ Ω/□ or lower, the adhesive sheet, even when used for temporarily fixing electronic parts having poor resistance to static electricity, such as magnetic heads, is effective in preventing the yield of such electronic parts from being reduced by electrostatic breakage, while ensuring its functions of adhesiveness before heating and peelability after heating. Furthermore, since the heat-expandable pressure-sensitive adhesive layer contains heat-expandable microspheres, the adhesive sheet can be adhered to an adherend at a predetermined adhesive force and, when the adhered state is desired to be ended, the adhesive sheet can be made easily peelable or separable by heat treatment. The adhesive sheet in which the heat-expandable pressure-sensitive adhesive layer before heating has a center line average surface roughness of 2 μm or less or a maximum surface roughness of 5 μm or less can ensure a sufficient effective contact area even when used for temporary fixation in which the adhesion area between the adhesive layer and the adherend is small, for example, as in the step of chip cutting. Consequently, failures attributable to insufficient adhesive force, such as chip scattering and position shifts, can be avoided, whereby the productivity or yield can be prevented from decreasing.

In the case where the heat-peelable pressure-sensitive adhesive sheet which has a rubber-like organic elastic layer interposed between the substrate and the heat-expandable pressure-sensitive adhesive layer is applied to an adherend, the surface of the pressure-sensitive adhesive sheet satisfactorily conforms to the surface shape of the adherend due to the elasticity of the rubber-like organic elastic layer. As a result, a large adhesion area and hence an enhanced adhesive strength can be obtained. When this adhesive sheet is heated for peeling from the adherend, the expansion (volume change) of the heat-expandable layer can be accurately controlled to thereby enable the heat-expandable layer to evenly expand preferentially in the thickness direction. As a result, the adhesive sheet can be more easily peeled off. In addition, even when the particle diameter of the heat-expandable microspheres contained in the heat-expandable pressure-sensitive adhesive layer is slightly too large, the surface roughness attributable to these microspheres is buffered by the rubber-like organic elastic layer. As a result, the heat-expandable pressure-sensitive adhesive layer can have reduced surface roughness.

The heat-peelable pressure-sensitive adhesive sheet of the invention may be used for permanently bonding an appropriate article as an adherend. However, since the adhesive sheet has the advantages described above, it is suitable for use in applications where an adherend is kept adherent thereto for a given period and this adhered state is desired to be ended after accomplishment of the purpose of adhesion. In particular, the adhesive sheet of the invention is most suitable for use as a temporarily fixing material in the production of magnetic heads, IC chips, and the like, in which application the use of conventional heat-peelable pressure-sensitive adhesive sheets results in a reduced yield due to static breakage.

Conditions for the heat treatment for facilitating the peeling of the pressure-sensitive adhesive sheet of the invention from an adherend can be suitably selected according to the desired degree of decrease in adhesion area, which depends on the surface state of the adherend, kind of the heat-expandable microspheres, etc., the heat resistance of the substrate and adherend, the heating means to be used, and others. General conditions for the heat treatment include a temperature of from 100 to 250° C. and a heating period of from 1 to 90 seconds (in the case of heating with a hot plate or the like) or from 5 to 15 minutes (in the case of heating in a hot-air drying chamber or the like). The pressure-sensitive adhesive layer is heated usually under such conditions to expand and/or foam the heat-expandable microspheres contained in the pressure-sensitive adhesive layer. As a result, the pressure-sensitive adhesive layer expands and deforms and, hence, the adhesive force is reduced or lost. The heat treatment can be conducted at a suitable stage according to the purpose of use. In some cases, an infrared lamp or hot water can be used as a heat source.

According to the heat-peelable pressure-sensitive adhesive sheet of the invention, even when it is used for temporarily fixing electronic parts susceptible to static breakage, such as magnetic heads, it is effective in preventing the yield of such electronic parts from being reduced by electrostatic breakage, while ensuring its functions of adhesiveness before heating and peelability after heating.

The invention will be described below in greater detail by reference to Examples, but the invention should not be construed as being limited by these Examples. Particle size was measured with laser scattering/diffraction particle size distribution analyzer Model SALD-2000J (manufactured by Shimadzu Corporation).

EXAMPLE 1

Heat-expandable microspheres A (MATSUMOTO MICROSPHERE F-50D; manufactured by Matsumoto Yushi Seiyaku K. K.; average particle diameter, 13.4 μm; maximum particle diameter, 63 μm) were classified with a centrifugal air classifier to obtain classified heat-expandable microspheres B (average particle diameter, 12.3 μm; maximum particle diameter, 42 μm).

On the other hand, a toluene solution of a pressure-sensitive adhesive composed of a 2-ethylhexyl acrylate/ethyl acrylate/methyl methacrylate copolymer (containing 1 part by weight of a polyurethane crosslinking agent) was applied to a 100 μm thick polyester film in a thickness of 10 μm on a dry basis. The coating was dried to form a rubber-like organic elastic layer.

A toluene solution containing 100 pars by weight of a pressure-sensitive adhesive composed of a 2-ethylhexyl acrylate/ethyl acrylate/methyl methacrylate copolymer (containing 2 parts by weight of a polyurethane crosslinking agent), 30 parts by weight of the classified heat-expandable microspheres B, and 80 parts by weight of an acicular conductive powder C (trade name; "PASSTRAN 5110S", manufactured by Mitsui Mining & Smelting Co., Ltd.) was applied to a separator in a thickness of 35 μm on a dry basis. The coating was dried to form a pressure-sensitive adhesive layer. This adhesive layer was adhered to the rubber-like organic elastic layer formed on the polyester film. Thus, an antistatic heat-peelable pressure-sensitive adhesive sheet was obtained.

EXAMPLE 2

The same procedure as in Example 1 was conducted, except that 100 parts by weight of a platy conductive powder D (trade name "PASTRAN 4610", manufactured by Mitsui Mining & Smelting Co., Ltd.) was used in place of 80 parts by weight of the acicular conductive powder C (trade name; "PASTRAN 5110S", manufactured by Mitsui Mining & Smelting Co., Ltd.). Thus, an antistatic heat-peelable pressure-sensitive adhesive sheet was obtained.

EXAMPLE 3

A quaternary ammonium salt type acrylic copolymer (trade name "BONDHIP-PA 100", manufactured by Konishi Co., Ltd.) was applied to a surface of a 50 μm thick polyester film in a thickness of 1 μm to impart electrical conductivity to the substrate. Subsequently, a toluene solution of a pressure-sensitive adhesive consisting mainly of a 2-ethylhexyl acrylate/ethyl acrylate/methyl methacrylate copolymer (containing 1 part by weight of a polyurethane crosslinking agent) was applied to the conductivity-imparted side of the substrate in a thickness of 10 μm on a dry basis. The coating was dried to form a rubber-like organic elastic layer.

A toluene solution containing 100 pars by weight of a pressure-sensitive adhesive composed of a 2-ethylhexyl acrylate/ethyl acrylate/methyl methacrylate copolymer (containing 2 parts by weight of a polyurethane crosslinking agent) and 30 parts by weight of the classified heat-expandable microspheres B was applied to a separator in a thickness of 35 μm on a dry basis. The coating was dried to form a pressure-sensitive adhesive layer. This adhesive layer was adhered to the rubber-like organic elastic layer formed on the polyester film. Thus, an antistatic heat-peelable pressure-sensitive adhesive sheet was obtained.

EXAMPLE 4

A toluene solution containing 100 parts by weight of a pressure-sensitive adhesive composed of a 2-ethylhexyl acrylate/ethyl acrylate/methyl methacrylate (30/70/5 by weight) copolymer (containing 2 parts by weight of a polyurethane crosslinking agent), 30 parts by weight of the classified heat-expandable microspheres B, and 3 parts by weight of a nonionic antistatic agent E (trade name "ELC EA", manufactured by Kao Corporation) was applied to a 100 μm thick polyester film in a thickness of 45 μm on a dry basis. The coating was dried to obtain an antistatic heat-peelable pressure-sensitive adhesive sheet.

COMPARATIVE EXAMPLE 1

The same procedure as in Example 1 was conducted, except that the acicular conductive powder C (trade name "PASTRAN 5110S", manufactured by Mitsui Mining & Smelting Co., Ltd.) was omitted. Thus, a heat-peelable pressure-sensitive adhesive sheet was obtained.

EVALUATION TEST

The surface resistivity of the heat-expandable pressure-sensitive adhesive layer of each of the pressure-sensitive adhesive sheets obtained in the Examples and Comparative Example was determined with high resistivity meter Hiresta UP MCP-HT 450 (manufactured by Mitsubishi Chemical Corp.). For this evaluation, the found value obtained at 1 minute after initiation of voltage application was used. The heat-expandable pressure-sensitive adhesive layer of each pressure-sensitive adhesive sheet before heating was further examined for center line average surface roughness and maximum surface roughness with a non-contact three-dimensional surface roughness meter (manufactured by ZYGO). Furthermore, each pressure-sensitive adhesive sheet was examined for adhesive force in the following manner. The adhesive sheet (20 mm wide) was applied to a 25 μm-thick polyester film (LUMILAR S-10, manufactured by Toray Industries, Inc.) by pressing the polyester film against the heat-expandable pressure-sensitive adhesive layer side of the adhesive sheet by rolling a 2 kg roller forward and backward once on the film. The resulting sample was examined for 180° peel strength (adhesive force) (unit, N/20 mm; the polyester film was peeled off at a rate of 300 mm/min at 23±2° C. and 65±5% RH) before and after heating. The heat treatment was conducted on a 130° C. hot plate for 60 seconds. The results of these evaluations are shown in the Table below.

Furthermore, the pressure-sensitive adhesive sheets obtained in the Examples and Comparative Example were used for temporary fixing in a GMR head processing step. As a result, when the pressure-sensitive adhesive sheets obtained in the Examples were used, neither static breakage nor adhesion failures, such as undesirable separation of parts from the pressure-sensitive adhesive sheet, occurred and the adhesive sheets could be smoothly peeled off after heating. In contrast, when the pressure-sensitive adhesive sheet obtained in the Comparative Example was used for the temporary fixing of GMR heads, static breakage occurred.

TABLE

| | Surface resistivity (Ω/□) | Center line average roughness (μm) | Maximum roughness (μm) | Adhesive force (N/20 mm) | |
|---|---|---|---|---|---|
| | | | | Before heating | After heating |
| Example 1 | $2.23 \times 10^8$ | 0.31 | 3.50 | 2.5 | ≦0.05 |
| Example 2 | $3.45 \times 10^7$ | 0.32 | 3.89 | 1.9 | ≦0.05 |
| Example 3 | $6.11 \times 10^{11}$ | 0.12 | 1.77 | 3.8 | ≦0.05 |
| Example 4 | $8.81 \times 10^{11}$ | 0.14 | 1.92 | 2.5 | ≦0.05 |
| Comparative Example 1 | $≧1.0 \times 10^{14}$ | 0.49 | 8.14 | 3.9 | ≦0.05 |

While the invention has been described in detail and with reference to specific embodiments thereof, it will be apparent on one skilled in the art that various changes and modifications can be made therein without departing from the spirit and scope thereof.

What is claimed is:

1. A heat-peelable pressure-sensitive adhesive sheet comprising a substrate and formed on at least one side thereof a heat-expandable pressure-sensitive adhesive layer containing heat-expandable microspheres, wherein the heat-expandable pressure-sensitive adhesive layer has a surface resistivity of $10^{12}$ Ω/□ or lower, and the heat-expandable pressure-sensitive adhesive layer before heating has a maximum surface roughness of 5 μm or less, and wherein at least one selected from the group consisting of inorganic conductive materials, organic antistatic agents and organic conductive materials is contained in or applied to the heat-expandable pressure-sensitive adhesive layer.

2. The heat-peelable pressure-sensitive adhesive sheet as claimed in claim 1, wherein the heat-expandable pressure-sensitive adhesive layer before heating has a center line average surface roughness of 2 μm or less.

3. The heat-peelable pressure-sensitive adhesive sheet as claimed in claim 1, which further comprises a rubber-like organic elastic layer interposed between the substrate and the heat-expandable pressure-sensitive adhesive layer.

4. The heat-peelable pressure-sensitive adhesive sheet as claimed in claim 3, wherein the rubber-like organic elastic layer comprises a pressure-sensitive adhesive material.

5. The heat-peelable pressure-sensitive adhesive sheet as claimed in claim 1, wherein the at least one of inorganic conductive materials, organic antistatic agents and organic conductive materials is contained in the heat-expandable pressure-sensitive adhesive layer and is a conductive powder.

6. A heat-peelable pressure-sensitive adhesive sheet comprising a substrate and above at least one side thereof a heat-expandable pressure-sensitive adhesive layer containing heat-expandable microspheres, wherein the heat-expandable pressure-sensitive adhesive layer has a surface resistivity of $10^{12}$ Ω/□ or lower, and the heat-expandable pressure-sensitive adhesive layer before heating has a maximum surface roughness of 5 μm or less, and wherein at least one selected from the group consisting of inorganic conductive materials, organic antistatic agents and organic conductive materials is applied to the substrate.

7. The heat-peelable pressure-sensitive adhesive sheet as claimed in claim 6, wherein an organic antistatic agent layer is formed on at least one side of the substrate.

8. The heat-peelable pressure-sensitive adhesive sheet as claimed in claim 6, wherein the heat-expandable pressure-sensitive adhesive layer before heating has a center line average surface roughness of 2 $\mu$m or less.

9. The heat-peelable pressure-sensitive adhesive sheet as claimed in claim 6, which further comprises a rubber-like organic elastic layer interposed between the substrate and the heat-expandable pressure-sensitive adhesive layer.

10. The heat-peelable pressure-sensitive adhesive sheet as claimed in claim 9, wherein the rubber-like organic elastic layer comprises a pressure-sensitive adhesive material.

11. The heat-peelable pressure-sensitive adhesive sheet as claimed in claim 6, wherein at least one selected from the group consisting of inorganic conductive materials and organic conductive materials is applied to the substrate.

* * * * *